United States Patent
Labrecque et al.

(10) Patent No.: US 11,674,450 B1
(45) Date of Patent: Jun. 13, 2023

(54) SYSTEM AND METHOD FOR SYNTHESIZING ENGINE THRUST

(71) Applicant: PRATT & WHITNEY CANADA CORP., Longueuil (CA)

(72) Inventors: Michel Labrecque, Sainte-Julie (CA); Kevin Nguyen, Montréal (CA); Ninad Joshi, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/548,779

(22) Filed: Dec. 13, 2021

(51) Int. Cl.
*F02C 9/16* (2006.01)
*F02C 3/04* (2006.01)

(52) U.S. Cl.
CPC .............. *F02C 9/16* (2013.01); *F02C 3/04* (2013.01); *F05D 2220/30* (2013.01); *F05D 2240/35* (2013.01); *F05D 2270/051* (2013.01); *F05D 2270/303* (2013.01); *F05D 2270/3013* (2013.01)

(58) Field of Classification Search
CPC ............. G01M 15/14; B64F 5/60; F02C 9/16; F02C 3/04; F05D 2220/30; F05D 2240/35; F05D 2270/051; F05D 2270/3013; F05D 2270/303
See application file for complete search history.

(56) References Cited

U.S. PATENT DOCUMENTS

| | | | | |
|---|---|---|---|---|
| 4,242,864 A | * | 1/1981 | Cornett | F02K 1/17 60/236 |
| 5,394,689 A | * | 3/1995 | D'Onofrio | F02C 9/28 60/204 |
| 9,897,517 B2 | * | 2/2018 | Djelassi | G01M 15/14 |
| 11,236,635 B2 | * | 2/2022 | Wilson | F02K 3/04 |
| 2018/0355804 A1 | * | 12/2018 | Miller | F02C 7/141 |
| 2019/0187014 A1 | * | 6/2019 | Werner-Spatz | G01L 5/133 |
| 2019/0391047 A1 | | 12/2019 | Bristow et al. | |
| 2020/0284207 A1 | * | 9/2020 | Sanusi | F02C 9/52 |

FOREIGN PATENT DOCUMENTS

RU 2346173 2/2009
UA 59443 9/2003

* cited by examiner

*Primary Examiner* — Jesse S Bogue
(74) *Attorney, Agent, or Firm* — Norton Rose Fulbright Canada LLP

(57) ABSTRACT

A method and a system for synthesizing thrust from a turbofan engine are provided. The turbofan engine comprising a compressor section, a combustor, and a turbine section in serial fluid flow communication. The engine is operated and, during the operating of the turbofan engine, a pressure of fluid at an exit of the compressor section and a temperature of fluid at a location upstream of the exit of the compressor section are determined. A synthesized value of thrust from the turbofan engine is determined based on a product of at least a first factor and a second factor, the first factor being a function of the pressure and the second factor being a function of the temperature. The synthesized value of thrust from the turbofan engine is output.

18 Claims, 7 Drawing Sheets

SYSTEM AND METHOD FOR SYNTHESIZING ENGINE THRUST

TECHNICAL FIELD

The application relates generally to engines, and, more particularly, to synthesizing thrust from a turbofan engine.

BACKGROUND OF THE ART

The amount of thrust produced by a engine generally varies based upon the performance and environmental demands placed on the engine as the engine operates under different conditions. It is therefore desirable to be able to generate an approximate value of the thrust from an engine in order to aid in the understanding of current engine operating conditions and provide predictability for performance demand requirements. While existing techniques for estimating thrust from an engine are suitable for their purposes, improvements are desired.

SUMMARY

In one aspect, there is provided a method for synthesizing thrust from a turbofan engine, the turbofan engine comprising a compressor section, a combustor, and a turbine section in serial fluid flow communication. The method comprises operating the turbofan engine, determining, during the operating of the turbofan engine, a pressure of fluid at an exit of the compressor section and a temperature of fluid at a location upstream of the exit of the compressor section, determining a synthesized value of thrust from the turbofan engine based on a product of at least a first factor and a second factor, the first factor being a function of the pressure and the second factor being a function of the temperature, and outputting the synthesized value of thrust from the turbofan engine.

In some embodiments, the method further comprises determining the first factor as a first mathematical function of the pressure, a first constant, and an adiabatic index of fluid within the turbofan engine, and determining the second factor as a second mathematical function of the temperature and the first constant.

In some embodiments, the determining the synthesized value of thrust from the turbofan engine comprises computing the product of the first factor, the second factor, and a second constant.

In some embodiments, values of the first constant and the second constant are determined for bringing a difference between the synthesized value of thrust from the turbofan engine and an actual thrust from the turbofan engine within a predetermined threshold, with the synthesized value of thrust from the turbofan engine being lower than the actual thrust from the turbofan engine.

In some embodiments, each of the first function and the second function is one of an exponential function, a quadratic function, and a logarithmic function.

In some embodiments, the method further comprises dividing the pressure by a reference pressure to obtain a normalized pressure and dividing the temperature by a reference temperature to obtain a normalized temperature, the first factor determined as the first function of the normalized pressure, the first constant, and the adiabatic index, and the second factor determined as the second function of the normalized temperature and the first constant.

In some embodiments, the compressor section comprises at least one low compressor stage positioned upstream of at least one high pressure compressor stage, the determining the pressure of fluid at the exit of the compressor section comprises obtaining at least one pressure measurement from at least one pressure sensor located at an outlet of the at least one high pressure compressor stage.

In some embodiments, the determining the pressure of fluid at the exit of the compressor section comprises obtaining at least one pressure measurement from at least one pressure sensor located at an inlet of the combustor.

In some embodiments, the method further comprises determining, during the operating of the turbofan engine, a fuel flow rate to the turbofan engine, the pressure of fluid at the exit of the compressor section determined from the fuel flow rate.

In some embodiments, the pressure of fluid at the exit of the compressor section is a first pressure, the method further comprising determining a second pressure of fluid at the location upstream of the exit of the compressor section and computing a ratio of the first pressure to the second pressure, the first factor determined as the first function of the ratio, the first constant, and the adiabatic index.

In some embodiments, the compressor section comprises at least one low pressure compressor stage positioned upstream of at least one high pressure compressor stage, the determining the second pressure comprises obtaining at least one pressure measurement from at least one pressure sensor located at an inlet of the at least one high pressure compressor stage, and the determining the temperature comprises obtaining at least one temperature measurement from at least one temperature sensor located at the inlet of the at least one high pressure compressor stage.

In some embodiments, the determining the second pressure comprises obtaining at least one pressure measurement from at least one pressure sensor located at an inlet of the turbofan engine, and the determining the temperature comprises obtaining at least one temperature measurement from at least one temperature sensor located at the inlet of the turbofan engine.

In another aspect, there is provided a system for synthesizing thrust from a turbofan engine, the turbofan engine comprising a compressor section, a combustor, and a turbine section in serial fluid flow communication. The system comprises a processing unit and a non-transitory computer-readable medium having stored thereon instructions executable by the processing unit for operating the turbofan engine, determining, during the operating of the turbofan engine, a pressure of fluid at an exit of the compressor section and a temperature of fluid at a location upstream of the exit of the compressor section, determining a synthesized value of thrust from the turbofan engine based on cavity product of at least a first factor and a second factor, the first factor being a function of the pressure and the second factor being a function of the temperature, and outputting the synthesized value of thrust from the turbofan engine.

In some embodiments, the instructions are executable by the processing unit for determining the first factor as a first mathematical function of the pressure, a first constant, and an adiabatic index of fluid within the turbofan engine, and determining the second factor as a second mathematical function of the temperature and the first constant.

In some embodiments, the instructions are executable by the processing unit for determining the synthesized value of thrust from the turbofan engine comprising computing the product of the first factor, the second factor, and a second constant.

In some embodiments, the instructions are executable by the processing unit for determining values of the first constant and the second constant for bringing a difference between the synthesized value of thrust from the turbofan engine and an actual thrust from the turbofan engine within a predetermined threshold, with the synthesized value of thrust from the turbofan engine being lower than the actual thrust from the turbofan engine.

In some embodiments, each of the first function and the second function is one of an exponential function, a quadratic function, and a logarithmic function.

In some embodiments, the instructions are executable by the processing unit for dividing the pressure by a reference pressure to obtain a normalized pressure and dividing the temperature by a reference temperature to obtain a normalized temperature, the first factor determined as the first function of the normalized pressure, the first constant, and the adiabatic index, and the second factor determined as the second function of the normalized temperature and the first constant.

In some embodiments, the compressor section comprises at least one low compressor stage positioned upstream of at least one high pressure compressor stage, and the instructions are executable by the processing unit for determining the pressure of fluid at the exit of the compressor section comprising obtaining at least one pressure measurement from at least one pressure sensor located at one of an outlet of the at least one high pressure compressor stage and an inlet of the combustor.

In some embodiments, the pressure of fluid at the exit of the compressor section is a first pressure, the instructions executable by the processing unit for determining a second pressure of fluid at the location upstream of the exit of the compressor section and computing a ratio of the first pressure to the second pressure, the first factor determined as the first function of the ratio, the first constant, and the adiabatic index.

DESCRIPTION OF THE DRAWINGS

Reference is now made to the accompanying figures in which.

It will be noticed that throughout the appended drawings, like features are identified by like reference numerals.

DETAILED DESCRIPTION

Figure 1:
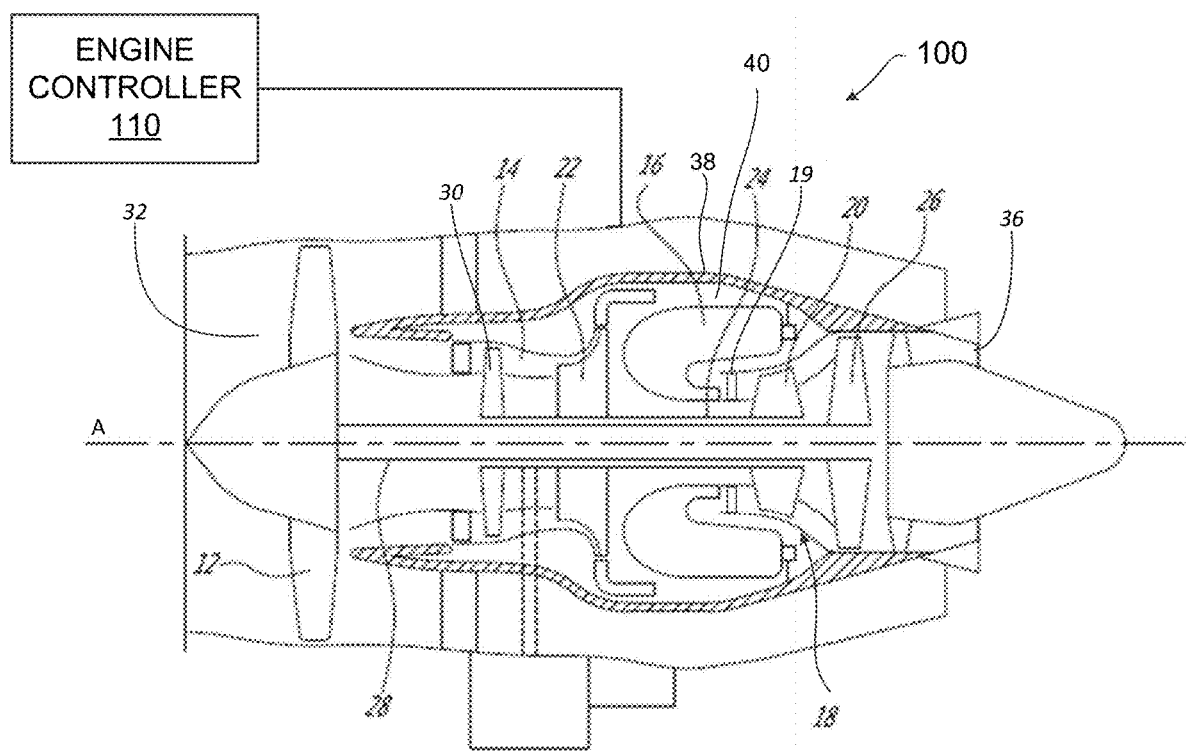
FIG. 1 is a schematic cross sectional view of a gas turbine engine, in accordance with an illustrative embodiment.

FIG. 1 illustrates an example gas turbine engine 100 to which the systems and methods described herein may be applied. In the illustrated embodiment, the engine 100 is a turbofan engine that generally comprises, in serial flow communication, a fan 12 through which ambient air is propelled toward an inlet 32, a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust 36. High pressure rotor(s) of the turbine section 18 (referred to as "HP turbine rotor(s) 20") are drivingly engaged to high pressure rotors of the compressor section 14 (referred to as "HP compressor rotor(s) 22") through a high pressure shaft 24 that rotates about axis 'A'. Axis 'A' defines an axial direction of the engine 100. Low pressure rotor(s) of the turbine section 18 (referred to as "LP turbine rotor(s) 26") are drivingly engaged to the fan rotor 12 and to low-pressure rotor(s) of the compressor section 14 (referred to as "LP compressor rotor(s) 30") through a low pressure shaft 28 extending within the high pressure shaft 24 and rotating independently therefrom about axis 'A'.

In one embodiment, the engine 100 includes a gas generator case 38 which surrounds and contains the combustor 16. The gas generator case 38 generally includes inner and outer portions (not shown), the outer portion of the case 38 defining an outer wall of a combustor cavity 40 containing the combustor 16. Although the engine 100 is described herein for flight applications, it should be understood that other uses, such as industrial or the like, may apply.

Control of the operation of the engine 100 can be effected by one or more control systems, for example an engine controller 110, which is communicatively coupled to the engine 100. The engine controller 110 can adjust a fuel flow provided to the engine 100, the position and orientation of variable geometry mechanisms within the engine 100, a bleed level of the engine 100, and the like, based on predetermined schedules or algorithms. In some embodiments, the engine controller 110 may be implemented as part of one or more full-authority digital engine controls (FADECs) or other similar device(s), including electronic engine controller(s) (EEC(s)), engine control unit(s) (ECU(s)), or the like, that are programmed to control the operation of the engine 100. The operation of the engine 100 can be controlled by way of one or more actuators, mechanical linkages, hydraulic systems, and the like. The engine controller 110 can be coupled to the actuators, mechanical linkages, hydraulic systems, and the like, in any suitable fashion for effecting control of the engine 100.

Figure 2:
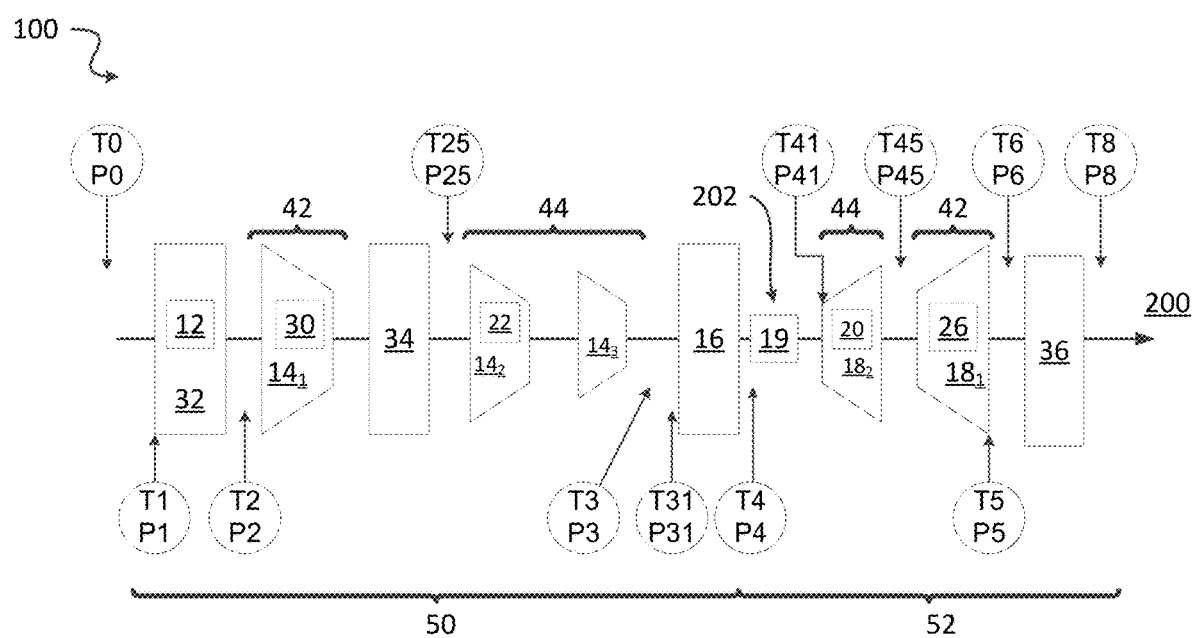
FIG. 2 is a schematic diagram illustrating locations of the engine of FIG. 1 identified using station numbering, in accordance with an illustrative embodiment.

With additional reference to FIG. 2, the engine 100 is illustrated schematically as having multiple elements forming a gas path along which gas flows from the inlet 32 to the exhaust 36 of the engine 100. The engine 100 illustrated in FIG. 2 includes two spools, namely a low-pressure spool 42, and a high-pressure spool 44. The low-pressure spool 42 includes a low-pressure compressor stage $14_1$, which includes the LP compressor rotor(s) 30, and a low-pressure turbine $18_1$, which includes the LP turbine rotors(s) 26. It should however be understood that the engine 100 may include more than two spools (e.g., three spools). In other embodiments of the engine 100, the low-pressure spool 42 can include more than one compressor stage. In the illustrated embodiment, the high-pressure spool 44 includes two high-pressure compressor stages $14_2$ and $14_3$ which include the HP compressor rotor(s) 22, and a high-pressure turbine $18_2$, which includes the HP turbine rotor(s) 20. In other embodiments of the engine 100, the high-pressure spool 44 can include only one compressor stage, or more than two (e.g., three) compressor stages. In the illustrated embodiment, an inter-compressor case (ICC) 34 is disposed between the low-pressure compressor stage $14_1$ and the high-pressure compressor stage $14_2$.

In one embodiment, specific locations of the engine 100 may be identified using station numbering. While station numbering is described herein with reference to the engine schematic diagram illustrated in FIG. 2, this is for example purposes only. The station numbering may be applied to other types of engines than the engine of FIG. 2, and station numbering of one or more standards or industry conventions may apply. Free stream conditions are identified as station number 0, where free stream refers to the air upstream of the engine 100. Engine intake front flange or leading edge is identified as station number 1. A first (e.g., LP) compressor entry is identified as station number 2. An intermediate (e.g., HP) compressor entry is identified as station number 25. A last (e.g., HP) compressor exit (referred to herein as an exit of the compressor section 14 or "compressor exit") is identified as station number 3. A combustor entry (or inlet) is identified as station number 31. A combustor exit is identified as station number 4. The last turbine exit is identified as station number 5. The flow conditions upstream of a mixer occur at station number 6. Station number 7 is at an entry of an exhaust nozzle or thrust reverser, station number 8 is at a nozzle throat and station number 9 is downstream of the nozzle throat or at an exhaust nozzle exit. The station numbers 0, 1, 2, 3, 4, 5, 6, 7, 8 and 9 may be referred to as fundamental station numbers. Station numbers between the fundamental station numbers may be referred to as intermediate station numbers. Intermediate station numbers may be denoted using a second digit suffixed to a fundamental station number, such as 12, 13, 15, 16, 21, 24, 25, 28, 31, 41, 43, 44, 45, 46, 49, and the like. It should be understood that intermediate station numbers may also be denoted using decimal numbers, such as 4.5.

As working fluids, for instance a gas mixture, pass through the engine 100, the working fluids undergo numerous pressure and temperature changes. Temperature and/or pressure measurements (e.g., working fluid temperature and/or working fluid pressure measurements) may be obtained for specific locations of the engine 100. The temperature and/or pressure measurements may be identified based on station numbering. As illustrated in FIG. 2, temperature (e.g., total or static temperature) measured at a specific location of the engine 100 may be denoted using a station number suffixed to the letter T. Similarly, pressure (e.g., total or static pressure) measured at a specific location of the engine 100 may be denoted using a station number suffixed to the letter P. Example temperature and pressure measurement locations, T0 to T8 and P0 to P8, for the flow of the gas mixture along the gas path 200 are illustrated in FIG. 2.

T0, taken upstream of the inlet 32, refers to free stream temperature, i.e. an ambient temperature of the environment surrounding the engine 100 and P0 refers to free stream pressure, i.e. an ambient pressure. Although illustrated as being captured upstream of the inlet 32, it should be understood that the ambient temperature T0 and the ambient pressure P0 can be captured at any suitable location in the environment in which the engine 100 is operating.

T1 refers to an inlet temperature, taken at the inlet 32 of the engine 100, just as the ambient air enters through the fan rotor 12, and P1 refers to an inlet pressure.

T2 refers to a low-pressure compressor inlet temperature, taken before the LP compressor rotor(s) 30 of the low-pressure compressor stage $14_1$, and P2 refers to a low-pressure compressor inlet pressure. T25 refers to a high-pressure compressor inlet temperature, taken between the ICC 34 and the high-pressure compressor stage $14_2$ (i.e. taken at the inlet of the high pressure compressor stage $14_2$), and P25 refers to a high-pressure compressor entry pressure.

T3 refers to a high-pressure compressor delivery (or discharge) temperature, taken after (i.e. at an outlet of) the high-pressure compressor stages $14_2$ and $14_3$, and P3 refers to a high-pressure compressor delivery pressure. T3 and P3 may be taken at the last compressor exit face), for instance after the HP compressor rotor(s) 22 for a high-pressure spool 44 including a single compressor stage. T31 refers to a combustor intake temperature and P31 refers to a combustor intake pressure. Measurements for T31 (or P31) can serve as a proxy for T3 (or P3) because the last compressor exit (where T3 or P3 is taken) and the entry to the combustor 16 (where T31 or P31 is taken) are in close proximity.

T4 refers to a combustor outlet temperature, taken before the HP turbine rotor(s) 20, and after the combustor 16, and P4 refers to a combustor outlet pressure. T41 refers to a temperature taken at or near an entry to the high-pressure turbine $18_2$, and P41 refers to pressure taken at the same location. Measurements for T41 (or P41) can serve as a proxy for T4 (or P4) because the exit of the combustor (where T4 or P4 is taken) and the entry to the high-pressure turbine $18_2$ (where T41 or P41 is taken) are in close proximity. T45 refers to a temperature taken between the high-pressure turbine $18_2$ and the low-pressure turbine $18_1$, and P45 corresponds to the pressure taken at the same location.

Located at an intermediate point between the combustor 16 and the high-pressure turbine $18_2$ is a vane 19. The vane 19 directs the gas mixture passing through the engine 100 toward the high-pressure turbine $18_2$. The geometry of the vane 19 defines a vane throat, which is referred to hereinafter as a high-pressure turbine (HPT) vane throat 202. The HPT vane throat 202 is a narrowing at the exit of the combustor 16 formed by the vane 19. For the purposes of the present disclosure, temperature values, pressure values, or other values which are said to be evaluated at the exit of the compressor section 14 may be evaluated at an outlet of the high-pressure compressor stages $14_2$ and $14_3$ (i.e. at station number 3), at an inlet of the combustor 16 (i.e. at station number 31), or at any other suitable location. Also, temperature values, pressure values, or other values which are said to be evaluated upstream of the exit of the compressor section 14 may be evaluated at an inlet of the engine 100 (i.e. at station number 1), at an inlet of a first high-pressure compressor stage $14_2$ (i.e. at station number 25), or at any other suitable location upstream of the exit of the compressor section 14.

T5 refers to the turbine outlet temperature and P5 refers to the turbine outlet pressure, taken after the LP turbine rotor(s) 26 of the low-pressure turbine $18_1$. T6 refers to an exhaust gas temperature and P6 refers to an exhaust gas pressure, taken between the low-pressure turbine $18_1$ and the exhaust 36. T8 refers to an exhaust gas temperature and P8 refers to an exhaust gas pressure, taken at the outlet of the exhaust 36, taken at the same location.

It should be noted that the above description of FIG. 2 pertains to an embodiment of the engine 100 which includes multiple spools, namely the low- and high-pressure spools 42, 44. The present disclosure may be applied to other types of engines, including engines with only one spool, or with more than two spools, as appropriate. Additionally, it should be understood that the foregoing disclosure relating to temperatures measurable within the engine 100 is not exhaustive, and various physical and/or virtual sensors may be deployed within the engine 100 to assess other temperature values for other locations within the engine 100.

Figure 3:
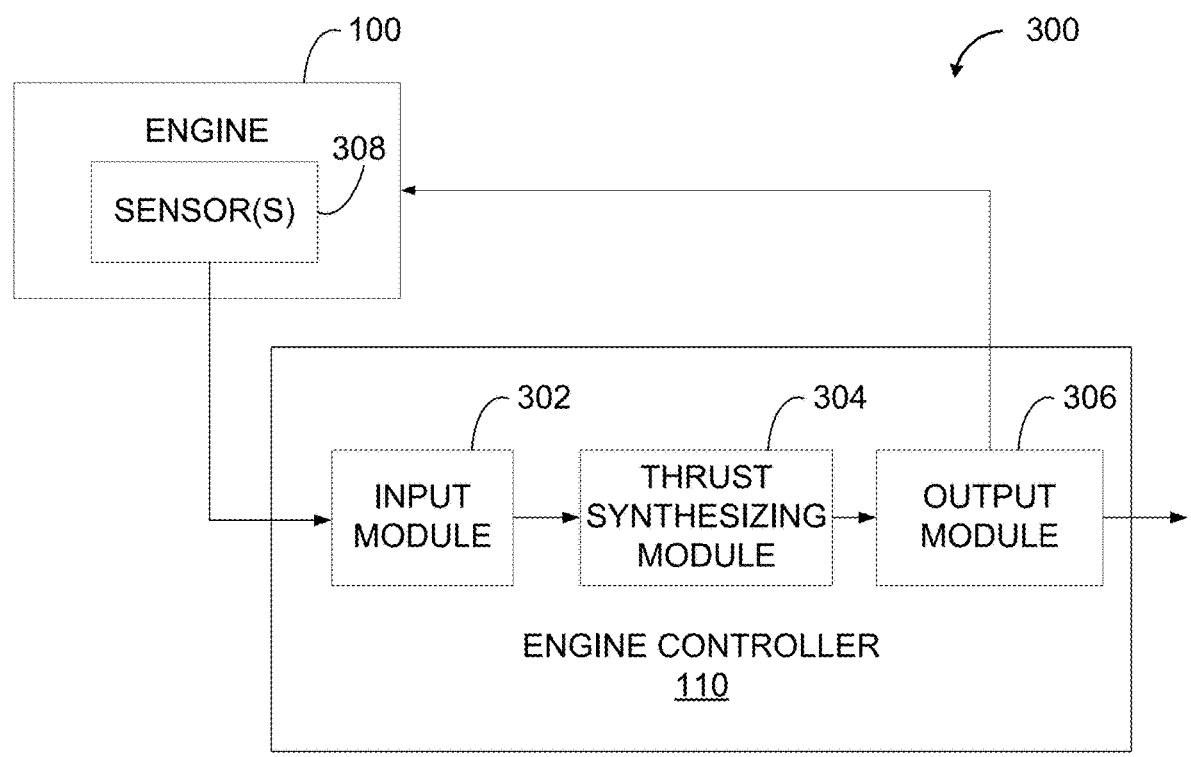
FIG. 3 is a block diagram illustrating a system for synthesizing thrust for the engine of FIG. 1, in accordance with an illustrative embodiment.

Referring now to FIG. 3 in addition to FIG. 1, an example system 300 for synthesizing thrust, i.e. for generating an approximate or synthesized value (referred to herein as "synthesizing") of thrust from a turbofan engine, such as the engine 100, will now be described. The engine 100 is configured to produce thrust, which is a mechanical force that moves an aircraft (not shown) the engine 100 is provided on. Thrust results from unbalanced momentum and pressure forces created within the engine 100. The engine controller 110, which can be electrically and/or mechanically coupled to the engine 100 in any suitable fashion, is configured to monitor the operating parameters of the engine 100 and to control at least part of the operation of the engine 100. As will be described further below, the controller 110 is configured to synthesize thrust from the engine 100 based on the monitored engine parameter(s), and more specifically based on pressure measured at an exit of the compressor section 14 (referred to herein as "compressor exit pressure") and on temperature measured upstream of the exit of the compressor section 14 (i.e. at a location upstream of the outlet of the last high-pressure compressor stage, e.g. compressor stage $14_3$). The synthesizes value of thrust (also referred to herein as "synthesized thrust") may aid in the understanding of current operating conditions of the engine 100, as well as enable calculation of a current performance state of the engine 100. The synthesized value of thrust may, in some embodiments, be used by the controller 110 to control operation of the engine 100.

The controller 110 illustratively comprises an input module 302, a thrust synthesizing module 304 communicatively coupled to the input module 302, and an output module 306 communicatively coupled to the thrust synthesizing module 304. One or more sensors 308 are provided on the engine 100 and configured to measure one or more parameters of the engine 100. In some embodiments, the sensor(s) 308 are pre-existing sensors of the engine 100. The sensor(s) 308 may comprise one or more of a temperature sensor, pressure sensor, altimeter, fuel flow sensor (or meter) and/or any other suitable sensor. The engine parameter(s) may include, but are not limited to, temperature of the engine 100, pressure of the engine 100, ambient air temperature, ambient air pressure, altitude, and fuel flow rate (Wf) to the engine 100. The engine parameter(s) may be measured continuously or at predetermined time intervals, and the measurements may be recorded in memory or any suitable storage (not shown) accessible by the controller 110. In some embodiments, the controller 110 may be configured to trigger an action to cause the sensor(s) 308 to acquire the engine parameter measurements.

In other embodiments, the values of the engine parameter(s) may be provided by an engine computer (e.g., the controller 110) or an aircraft computer (not shown), which may be configured to synthesize one or more of the engine parameter(s). In some embodiments, the value of a first engine parameter (e.g., pressure) may be obtained directly from the sensor(s) 308 and the value of a second engine parameter (e.g., temperature) may be provided by the engine computer or the aircraft computer, or vice versa. Other embodiments may apply. The engine computer or the aircraft computer may be configured to calculate one or more engine parameters from an arithmetic function of one or more engine parameters. For example, the one or more engine parameters may be the summation, delta, product, quotient, exponent or other arithmetic function of multiple engine parameters.

It is proposed herein to synthesize the thrust of the engine 100 as a function of compressor exit pressure and of temperature measured upstream of the compressor exit, e.g., as measured using sensor(s) 308. In this manner, equipment (e.g., sensor(s) 308) provided in a cold section (reference 50 in FIG. 2) of the engine 100 may be used to synthesize thrust, thus alleviating the need for equipment or instrumentation provided in a hot section (reference 52 in FIG. 2) of the engine 100. In this manner, by using equipment provided in the cold section of the engine 100, the overall life of the engine components may be increased.

In one embodiment, the synthesized value of thrust is generated by the thrust synthesizing module 304 based on the high-pressure compressor delivery pressure (P3), i.e. on pressure measurement(s) acquired by sensor(s) 308 located at engine station number 3. It should however be understood that, in other embodiments, the synthesized value of thrust may be generated based on the combustor intake pressure (P31) taken at engine station number 31 since the combustor intake pressure can serve as a proxy for the high-pressure compressor delivery pressure, as previously noted.

In some embodiments, the thrust synthesizing module 304 may alternatively be configured to synthesize the thrust of the engine 100 as a function of a pressure ratio computed based on the compressor exit pressure. In one embodiment, the pressure ratio across one or more compressor stages of the engine 100 may be used. For example, the thrust synthesizing module 304 may be configured to compute a ratio of the compressor exit pressure (e.g., P3 or P31) to the high-pressure compressor pressure (P25). In other words, the ratio P3/P25 or P31/P25 is computed and used to synthesize engine thrust. In another embodiment, the thrust synthesizing module 304 may be configured to compute a ratio of the compressor exit pressure (e.g., P3 or P31) to the engine inlet pressure (P1). In other words, the ratio P3/P1 or P31/P1 is computed and used to synthesize engine thrust.

In addition, because engine thrust is influenced by the temperature of working fluids, for instance the gas mixture, passing through the engine 100, the thrust synthesizing module 304 is also configured to synthesize the thrust of the engine 100 as a function of temperature measured (e.g., using the sensor(s) 308) upstream of the exit of the compressor section 14. More specifically and as will be discussed further below, the thrust synthesizing module 304 is configured to synthesize thrust as a function of pressure weighted by temperature, by computing a product of pressure and temperature values. In one embodiment, the temperature measurement used by the thrust synthesizing module 304 to synthesize the thrust is the engine's inlet temperature (T1), i.e. obtained from temperature measurement(s) acquired by the sensor(s) 308 located at engine station number 1. In other embodiments, the thrust may be synthesized based on the high-pressure compressor temperature (T25) taken at engine station number 25. The temperature measurement used to synthesize thrust may therefore be acquired at an intermediate compressor stage. It should be understood that other embodiments may apply and the temperature measurement may be acquired at any other suitable location upstream of the exit of the compressor section 14. For instance, in some embodiments, the thrust may be synthesized based on the low-pressure compressor inlet temperature (T2) taken at engine station 2, i.e. taken before the LP turbine rotor(s) 26 of the low-pressure compressor stage $14_1$. For example, the product of P3 and T1 (or similarly the product of P31 and T1), the product of P3 and T25 (or similarly the product of P31 and T25) or the product of P3 and T2 (or similarly the product of P31 and T2) may be used to synthesize thrust. In addition, pressure ratios computed based on compressor exit pressure (e.g., P3/P25, P31/P25, P3/P1, P31/P1, P3/P2, or P31/P2) may also be weighted by temperatures (e.g., T1, T25 or T2) to provide the synthesized thrust.

Still referring to FIG. 3, the input module 302 is configured to receive the engine parameters (e.g., pressure and temperature) measured by the sensor(s) 308, during operation of the engine 100. In some embodiments, the input module 302 may be configured to pre-process (e.g., filter to remove noise, using any suitable filtering means such as a digital filter or the like) the signal(s) containing the engine parameter measurements received from the sensor(s) 308. The signal(s), which are optionally pre-processed, are then transmitted to the thrust synthesizing module 304 which uses the engine parameter measurements to synthesize thrust for the engine 100. While reference is made herein to the thrust synthesizing module 304 using measurements from the sensor(s) 308 to synthesize thrust from the engine 100, it should be understood that the thrust synthesizing module 304 may synthesize thrust based on synthesized engine parameters, as described herein above.

As will be described further below, the thrust synthesizing module 304 is configured to compute the synthesized thrust as a function of the product of at least a first factor and a second factor, the first factor being a function of the compressor exit pressure and the second factor being a function of the temperature measurement upstream of the compressor exit. In one embodiment, the synthesized thrust is computed as follows:

$$\text{Synthesized thrust} = k * P * f(T, a) \quad (1)$$

where Synthesized thrust is the synthesized value of the thrust from the engine 100, P is the compressor exit pressure, T is the temperature upstream of the compressor exit, k and a are constants whose values are selected to produce a synthesized value of thrust that is within a desired threshold (or tolerance) of the actual (or true) thrust of the engine 100, and $f$ is a mathematical relationship between (or a mathematical function of) T and a. In equation (1), the first factor is P and the second factor is $f$ (T, a).

The values of k and a may vary depending on the configuration and on operating conditions of the engine 100 including, but not limited to, flight conditions, altitude, airspeed, installation losses, and flight regime (e.g., takeoff, cruise, climb, descent, landing, etc.). The values of k and a may be determined and refined through development testing performed on ground and/or in flight. In one embodiment, the engine 100 is operated under a test environment (e.g., in a production test cell provided at a testing facility) to obtain the values of the constants (k and a) used to synthesize thrust. It should however be understood that simulation and/or modeling of the engine 100 may also be used (e.g., through the controller 110) during a testing phase of the engine 100 to obtain the values of the constants k and a. Once determined, the values of k and a may be stored (in any suitable format such as a map, matrix, or lookup-table) in memory or other suitable storage accessible by the controller 110.

The values of k and a are selected to ensure that the synthesized thrust is below the actual thrust delivered by the engine 100. In one embodiment, the values of k and a are selected to bring a difference between the synthesized thrust and the actual thrust within a predetermined threshold (or tolerance). For example, the thrust synthesizing module 304 may be configured to provide a synthesized value of the engine's thrust that is below the actual thrust of the engine 100 by the desired tolerance (e.g., 10% or the like), the tolerance depending on operating conditions on the engine 100. In this manner, in operation, the engine 100 may deliver more thrust than the synthesized thrust, which translates in the aircraft's actual performance being better than expected. In one embodiment, the value of k may range between 1 and 300 and the value of a may range between 0 and 5. Other embodiments may apply.

Any suitable mathematical function $f$ may apply, depending on the configuration and on operating conditions of the engine 100. The mathematical function $f$ may be selected to improve the accuracy of the synthesized value of the thrust delivered by the engine 100. In one embodiment, an exponential relationship (or function) may be used as the mathematical function $f$. For example, an exponential relationship (i.e. an exponentiation operation)

$$T^a \left( \text{or } \frac{T^a}{T_{ref}} \right)$$

between the temperature T (or the non-dimensionalized temperature $$\frac{T}{T_{ref}},$$

as discussed below with reference to equation (2)) and the constant a may apply. With the thrust being synthesized as a function of pressure measured at station 3 (i.e. P3) and the temperature being measured at station 1 (i.e. T1), equation (1) therefore becomes in this example:

$$\text{Synthesized thrust} = k * P_3 * T_i^a \quad (2)$$

It should however be understood that any other suitable mathematical function other than the exponential function, including, but not limited to, a quadratic function and a logarithmic function, may apply.

In some embodiments, the thrust synthesizing module 304 may be configured to correct (i.e. non-dimensionalize or normalize) the engine parameters in order to take into account ambient conditions. In other words, although equation (1) above makes use of the raw pressure and temperature values (e.g., as obtained from the sensor(s) 308 or synthesized in any suitable manner) to synthesize thrust, thrust may be synthesized using non-dimensionalized (or referred) pressure and temperature values. For this purpose, the thrust synthesizing module 304 may be configured to divide the compressor exit pressure by a reference pressure to obtain a non-dimensionalized (or "referred") pressure, and to divide the temperature upstream of the compressor exit by a reference temperature to obtain a non-dimensionalized (or "referred") temperature. In one embodiment, the reference pressure is 14.696 psi (pounds per square inch) and the reference temperature is 518.67° R on the Rankine scale, at standard sea level. Other embodiments may apply.

With the thrust being synthesized as a function of the non-dimensionalized pressure and the non-dimensionalized temperature, equation (1) therefore becomes:

$$\text{Synthesized thrust} = k * \frac{P}{P_{ref}} * f\left(\frac{T}{T_{ref}}, a\right) \quad (3)$$

where $P_{ref}$ is the reference pressure, is the non-dimensionalized compressor exit $$\frac{P}{P_{ref}}$$

pressure, $T_{ref}$ is the reference temperature, $$\frac{T}{T_{ref}}$$

is the non-dimensionalized temperature upstream of the compressor exit.

While equations (1), (2), and (3) above are described with reference to the compressor exit pressure, it should be understood that equations (1), (2), and (3) may also be used when pressure ratios are derived from the compressor exit pressure, as described above. In this case, equations (1) and (3) above become:

$$\text{Synthesized thrust} = k * f_1(P_{ratio}, \gamma, a) * f_2(T, a) \quad (4)$$

And:

$$\text{Synthesized thrust} = k * f_1\left(\frac{P_{ratio}}{P_{ref}}, \gamma, a\right) * f_2\left(\frac{T}{T_{ref}}, a\right) \quad (5)$$

where $P_{ratio}$ is the pressure ratio derived from the compressor exit pressure, $\gamma$ is the adiabatic index of working fluid flowing through the turbofan engine 100, $f_1$ is a first mathematical relationship between (or a first mathematical function of) $P_{ratio}$, $\gamma$, and a, and $f_2$ is a second mathematical relationship between (or a second mathematical function of) T and a. For example, $P_{ratio}$ may be P3/P1, P31/P1, P3/P25, or P31/P25. The adiabatic index $\gamma$ is a constant that refers to the ratio of the heat capacity of the working fluid at constant pressure to heat capacity at constant volume. In some embodiments, the same mathematical functions (e.g., exponential relationship) may apply for $f_1$ and $f_2$.

In one embodiment, each mathematical function $f_1$, $f_2$ is an exponential relationship such that (when the pressure ratio is computed as a ratio of P3/P1 and the temperature T1 is measured):

$$f_1(P_{ratio}, \gamma, a) = \frac{[P_3]^{\frac{a(\gamma-1)+\gamma}{\gamma}}}{[P_1]^{\frac{a(\gamma-1)}{\gamma}}} \quad (6)$$

And:

$$f_2(T, a) = T_1^a \quad (7)$$

And similarly (when the pressure ratio is computed as a ratio of P3/P1 and the temperature T1 is measured):

$$f_1\left(\frac{P_{ratio}}{P_{ref}}, \gamma, a\right) = \frac{1}{P_{ref}} * \frac{[P_3]^{\frac{a(\gamma-1)+\gamma}{\gamma}}}{[P_1]^{\frac{a(\gamma-1)}{\gamma}}} \quad (8)$$

And:

$$f_2\left(\frac{T}{T_{ref}}, a\right) = \left(\frac{T_1}{T_{ref}}\right)^a \quad (9)$$

Since the compression process in a gas turbine engine, such as the engine 100, is accompanied by aerodynamic and thermodynamic losses and singularities, the mathematical depiction of the compression process may be considered polytropic with the governing exponent being lower than the adiabatic index $\gamma$.

Thus, in one embodiment, when the compressor exit pressure is measured at station 3 (i.e. P3 is used) and the temperature upstream of the compressor exit is measured at station 1 (i.e. T1 is used), the synthesized thrust may be obtained as follows:

$$\text{Synthesized thrust} = k * \frac{1}{P_{ref}} * \frac{[P_3]^{\frac{a(\gamma-1)+\gamma}{\gamma}}}{[P_1]^{\frac{a(\gamma-1)}{\gamma}}} * \left(\frac{T_1}{T_{ref}}\right)^a \quad (10)$$

As another example, when the compressor exit pressure measured at station 3 (i.e. P3 is used) and the temperature upstream of the compressor exit is measured at station 25 (i.e. T25 is used), the synthesized thrust may be obtained as follows:

$$\text{Synthesized thrust} = k * \frac{1}{P_{ref}} * \frac{[P_3]^{\frac{a(\gamma-1)+\gamma}{\gamma}}}{[P_{25}]^{\frac{a(\gamma-1)}{\gamma}}} * \left(\frac{T_{25}}{T_{ref}}\right)^a \quad (11)$$

In still other embodiments, fuel flow rate ($W_f$) to the engine 100 may be used to synthesize thrust. In particular, the ratio of fuel flow rate to compressor exit pressure (referred to herein as a "Ratio Unit" or RU, where RU=$W_f$/P, where P is the compressor exit pressure) may be used to synthesize thrust. In this case, the compressor exit pressure (e.g., P3 or P31) may be derived from the fuel flow rate and the ratio unit, such that P is replaced by $W_f$/RU in the equation for computing the synthesized thrust.

For example, when the compressor exit pressure is measured at station 3 (i.e. P3 is used) and the temperature upstream of the compressor exit is measured at station 1 (i.e. T1 is used), the synthesized thrust may be obtained as follows:

$$\text{Synthesized thrust} = k * \frac{1}{P_{ref}} * \frac{\left[\frac{W_f}{RU}\right]^{\frac{a(\gamma-1)+\gamma}{\gamma}}}{[P_1]^{\frac{a(\gamma-1)}{\gamma}}} * \left(\frac{T_1}{T_{ref}}\right)^a \quad (12)$$

As another example, when the compressor exit pressure measured at station 3 (i.e. P3 is used) and the temperature upstream of the compressor exit is measured at station 25 (i.e. T25 is used), the synthesized thrust may be obtained as follows:

$$\text{Synthesized thrust} = k * \frac{1}{P_{ref}} * \frac{\left[\frac{W_f}{RU}\right]^{\frac{a(\gamma-1)+\gamma}{\gamma}}}{[P_{25}]^{\frac{a(\gamma-1)}{\gamma}}} * \left(\frac{T_{25}}{T_{ref}}\right)^a \quad (13)$$

The thrust synthesizing module 302 may then provide the synthesized thrust to the output module 306. In some embodiments, the output module 306 may be configured to output the synthesized thrust to a suitable output device (e.g., a cockpit display or the like). In other embodiments, the output module 306 may be configured to generate, based on the synthesized thrust, one or more control signals for use in controlling the operation of the engine 100. The output module 306 may then output the control signal(s) to the engine 100 (e.g., to the actuators, mechanical linkages, hydraulic systems, and the like coupled to the engine controller 110), using any suitable means, for effecting control of the engine 100 based on the synthesized thrust.

Figure 4:
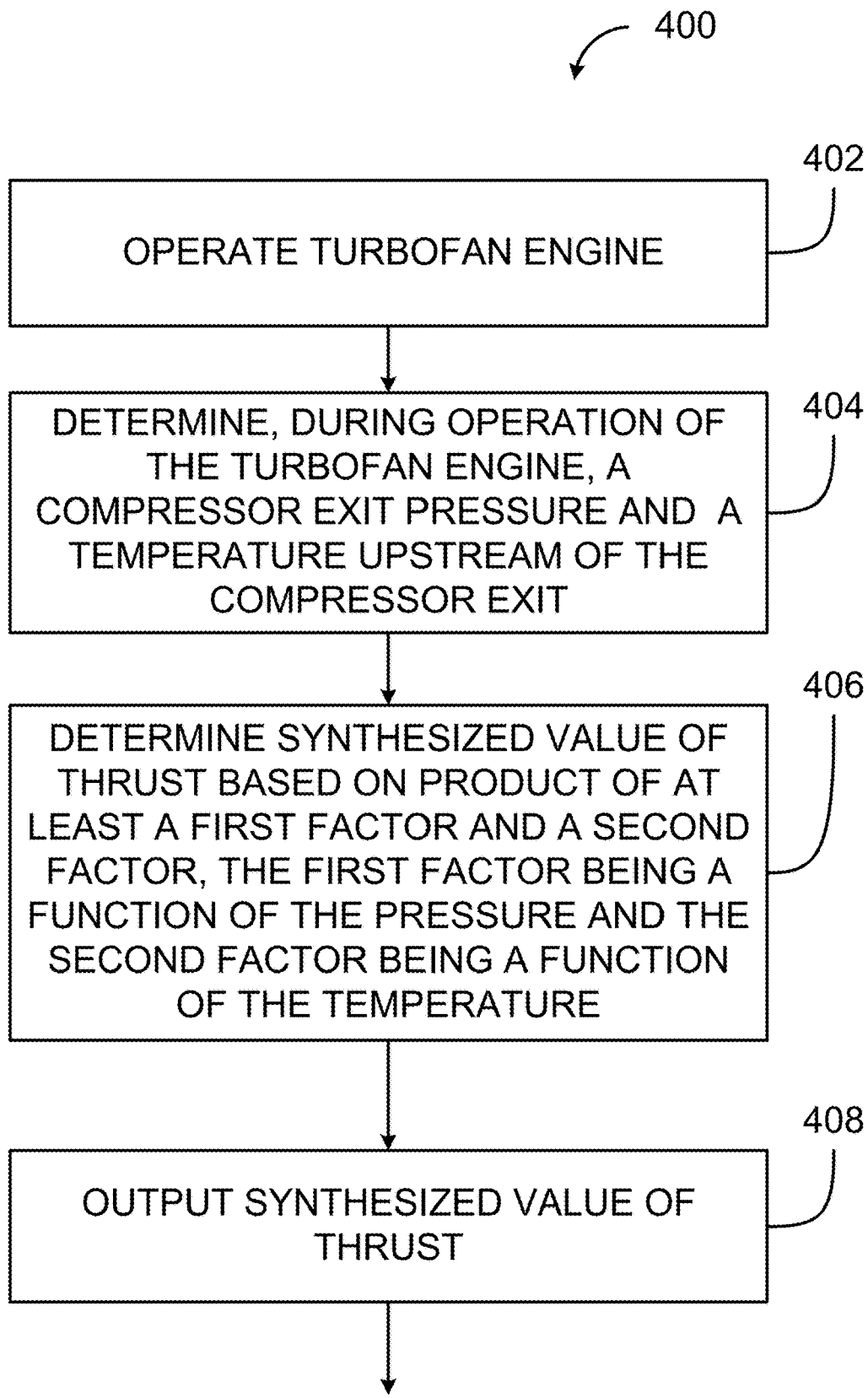
FIG. 4 is a flowchart illustrating a method for synthesizing thrust for the engine of FIG. 1, in accordance with an illustrative embodiment.

Referring now to FIG. 4, a flowchart illustrating an example method 400 for synthesizing thrust for a turbofan engine, such as the engine 100 of FIG. 1, will now be described. At step 402, the turbofan is operated. At step 404, a compressor exit pressure of the turbofan engine and a temperature upstream of the compressor exit are determined during operation of the turbofan engine. As described above with reference to FIGS. 1 to 3, in one embodiment, the compressor exit pressure may be determined based on at least one pressure measurement obtained from at least one pressure sensor located at an outlet of at least one high compressor stage of the turbofan engine. In another embodiment, the compressor exit pressure may be determined based on at least one pressure measurement obtained from at least one pressure sensor located at an inlet of the combustor. In addition, in one embodiment, the temperature upstream of the engine's compressor exit used to synthesize the thrust is the engine inlet temperature. In other embodiments, the thrust may be synthesized based on the high-pressure compressor temperature.

At step 406, a synthesized value of thrust from the turbofan engine is determined (as per equations (1) to (13) above) based on a product of at least a first factor and a second factor, the first factor being a function of the compressor exit pressure and the second factor being a function of the temperature upstream of the compressor exit. In some embodiments, the thrust may be synthesized based on a ratio of the compressor exit pressure to a pressure at an inlet of the at least one high compressor stage. In other embodiments, the thrust may be synthesized based on a ratio of the compressor exit pressure to a pressure at an intake of the turbofan engine. In some embodiments, the compressor exit pressure is derived based on a fuel flow rate to the turbofan engine (determined during operation of the turbofan engine) and then used to synthesize thrust. In some embodiments, the pressure is divided by a reference pressure in order to obtain a referred (also referred to as a normalized or non-dimensionalized) pressure (used to determine the first factor), and the temperature is divided by a reference temperature in order to obtain a referred (also referred to as a normalized or non-dimensionalized) temperature (used to determine the second factor). As described herein above, the first factor may further be determined as a function of the pressure of working fluid at the exit of the compressor section and an adiabatic index of the turbofan engine. The synthesized thrust may then be output at step 408.

Figure 5A:
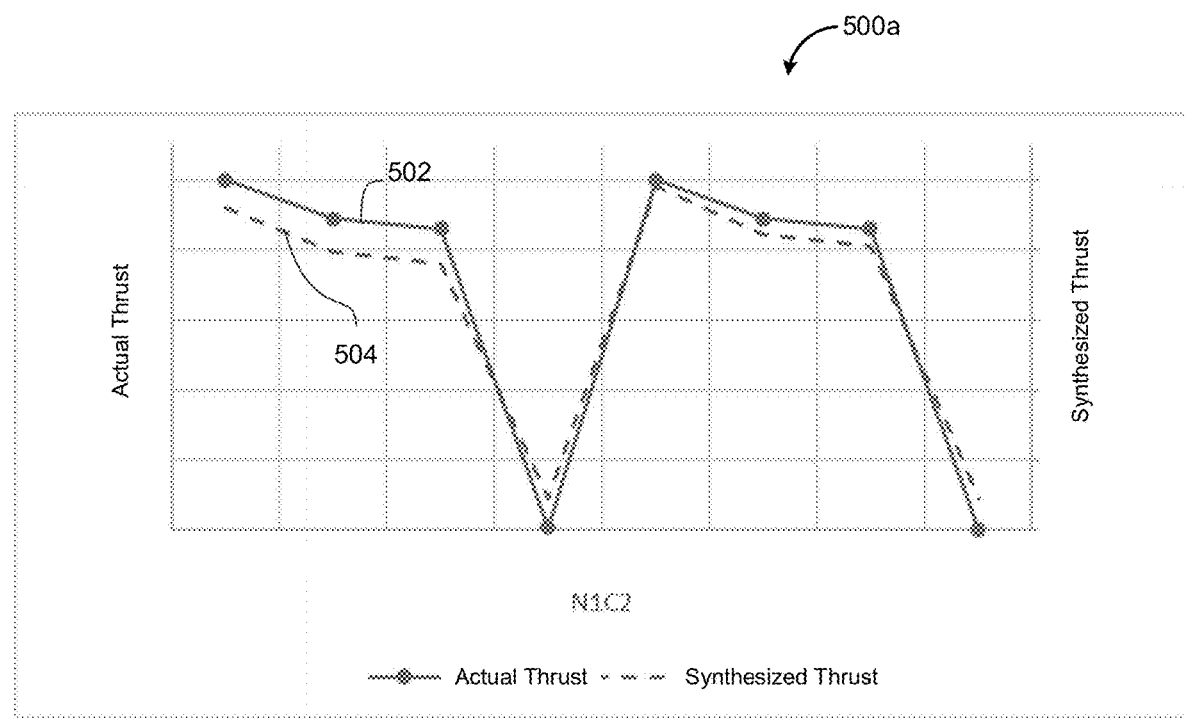
FIGS. 5A and 5B are graphs illustrating an actual thrust and a synthesized thrust for the engine of FIG. 1, in accordance with an illustrative embodiment.
Figure 5B:
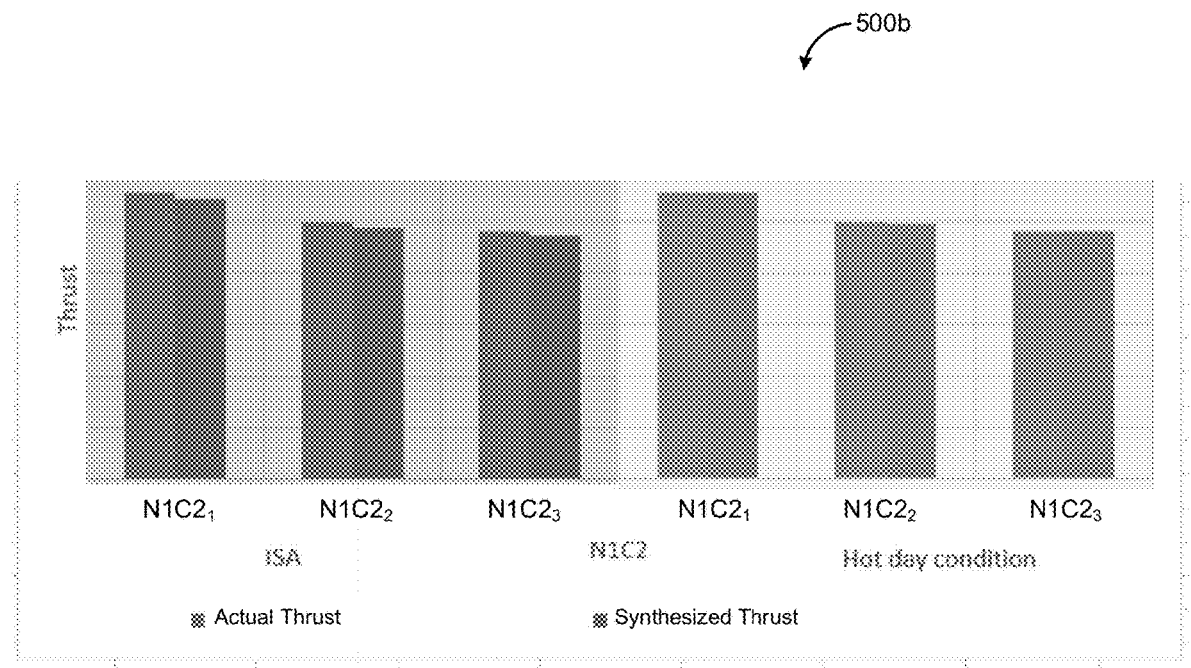

Referring now to FIG. 5A, a graph 500a plots in solid line a curve 502 of the true (or actual) thrust of a turbofan engine, such as the engine 100, versus fan speed corrected to engine inlet conditions (N1C2), taken at ground conditions. A curve 504 (illustrated in dashed lines) is indicative of the synthesized thrust from the engine versus N1C2, at ground conditions, the synthesized thrust obtained using the systems and methods described herein. FIG. 5B shows as a bar chart 500b the synthesized thrust from the turbofan engine compared to the actual thrust delivered by the turbofan engine, for varying temperature conditions (i.e. internal standard atmosphere (ISA) conditions (on the left) versus hot day conditions (on the right)), for different corrected fan speed values ($N1C2_1$, $N1C2_2$, and $N1C2_3$). It can be seen from FIGS. 5A and 5B that the synthesized thrust (e.g., curve 504 in FIG. 5A) is equal to or below the true (or actual) thrust (e.g., curve 502 in FIG. 5A), which is indicative of the ability of the system and methods described herein to accurately synthesize engine thrust. While FIG. 5A illustrates the actual and synthesized thrust at ground conditions, it should be understood that the systems and methods described herein may be configured to synthesize thrust for flight conditions, at various altitudes and ambient temperatures.

Figure 6:
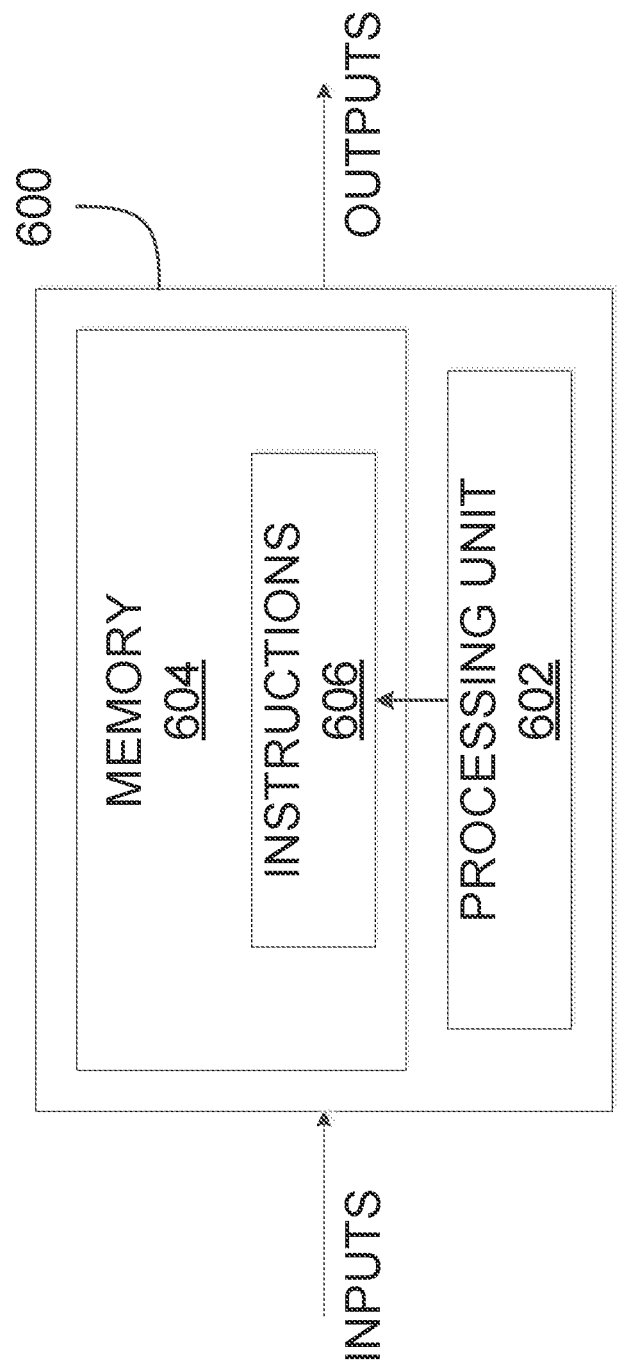
FIG. 6 is a block diagram of an example computing device, in accordance with an illustrative embodiment.

With reference to FIG. 6, an example of a computing device 600 is illustrated. For simplicity only one computing device 600 is shown but more computing devices 600 operable to exchange data may be provided. The computing devices 600 may be the same or different types of devices. The controller (reference 110 of FIG. 3) and/or the method (reference 400 of FIG. 1) may be implemented with one or more computing devices 600. Other embodiments may also apply.

The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems described herein may be implemented in a high level procedural or object oriented programming or scripting language, or a combination thereof, to communicate with or assist in the operation of a computer system, for example the computing device 500. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for synthesizing thrust from a turbofan engine, the turbofan engine comprising a compressor section, a combustor, and a turbine section in serial fluid flow communication, the method comprising:
   operating the turbofan engine;
   determining, during the operating of the turbofan engine, a pressure of fluid at an exit of the compressor section and a temperature of fluid at a location upstream of the exit of the compressor section;
   determining a synthesized value of thrust from the turbofan engine based on a product of at least a first factor determined as a first mathematical function of the pressure, a first constant, and an adiabatic index of fluid within the turbofan engine, and a second factor determined as a second mathematical function of the temperature and the first constant; and
   outputting the synthesized value of thrust from the turbofan engine.

2. The method of claim 1, wherein the determining the synthesized value of thrust from the turbofan engine comprises computing the product of the first factor, the second factor, and a second constant.

3. The method of claim 2, wherein values of the first constant and the second constant are determined for bringing a difference between the synthesized value of thrust from the turbofan engine and an actual thrust from the turbofan engine within a predetermined threshold, with the synthesized value of thrust from the turbofan engine being lower than the actual thrust from the turbofan engine.

4. The method of claim 1, wherein each of the first mathematical function and the second mathematical function is one of an exponential function, a quadratic function, and a logarithmic function.

5. The method of claim 1, further comprising dividing the pressure by a reference pressure to obtain a normalized pressure and dividing the temperature by a reference temperature to obtain a normalized temperature, the first factor determined as the first mathematical function of the normalized pressure, the first constant, and the adiabatic index, and the second factor determined as the second mathematical function of the normalized temperature and the first constant.

6. The method of claim 1, wherein the compressor section comprises at least one low compressor stage positioned upstream of at least one high pressure compressor stage, further wherein the determining the pressure of fluid at the exit of the compressor section comprises obtaining at least one pressure measurement from at least one pressure sensor located at an outlet of the at least one high pressure compressor stage.

7. The method of claim 1, wherein the determining the pressure of fluid at the exit of the compressor section comprises obtaining at least one pressure measurement from at least one pressure sensor located at an inlet of the combustor.

8. The method of claim 1, further comprising determining, during the operating of the turbofan engine, a fuel flow rate to the turbofan engine, the pressure of fluid at the exit of the compressor section determined from the fuel flow rate.

9. The method claim 1, wherein the pressure of fluid at the exit of the compressor section is a first pressure, the method further comprising determining a second pressure of fluid at the location upstream of the exit of the compressor section and computing a ratio of the first pressure to the second pressure, the first factor determined as the first mathematical function of the ratio, the first constant, and the adiabatic index.

10. The method claim 9, wherein the compressor section comprises at least one low pressure compressor stage positioned upstream of at least one high pressure compressor stage, further wherein the determining the second pressure comprises obtaining at least one pressure measurement from at least one pressure sensor located at an inlet of the at least one high pressure compressor stage, and the determining the temperature comprises obtaining at least one temperature measurement from at least one temperature sensor located at the inlet of the at least one high pressure compressor stage.

11. The method claim 9, wherein the determining the second pressure comprises obtaining at least one pressure measurement from at least one pressure sensor located at an inlet of the turbofan engine, and further wherein the determining the temperature comprises obtaining at least one temperature measurement from at least one temperature sensor located at the inlet of the turbofan engine.

12. A system for synthesizing thrust from a turbofan engine, the turbofan engine comprising a compressor section, a combustor, and a turbine section in serial fluid flow communication, the system comprising:
   a processing unit; and
   a non-transitory computer-readable medium having stored thereon instructions executable by the processing unit for:
      operating the turbofan engine;
      determining, during the operating of the turbofan engine, a pressure of fluid at an exit of the compressor section and a temperature of fluid at a location upstream of the exit of the compressor section;
      determining a synthesized value of thrust from the turbofan engine based on a product of at least a first factor determined as a first mathematical function of the pressure, a first constant, and an adiabatic index of fluid within the turbofan engine, and a second factor determined as a second mathematical function of the temperature and the first constant; and
      outputting the synthesized value of thrust from the turbofan engine.

13. The system of claim 12, wherein the instructions are executable by the processing unit for determining the synthesized value of thrust from the turbofan engine comprising computing the product of the first factor, the second factor, and a second constant.

14. The system of claim 13, wherein the instructions are executable by the processing unit for determining values of the first constant and the second constant for bringing a difference between the synthesized value of thrust from the turbofan engine and an actual thrust from the turbofan engine within a predetermined threshold, with the synthesized value of thrust from the turbofan engine being lower than the actual thrust from the turbofan engine.

15. The system of claim 12, wherein each of the first mathematical function and the second mathematical function is one of an exponential function, a quadratic function, and a logarithmic function.

16. The system of claim 12, wherein the instructions are executable by the processing unit for dividing the pressure by a reference pressure to obtain a normalized pressure and dividing the temperature by a reference temperature to obtain a normalized temperature, the first factor determined as the first mathematical function of the normalized pressure, the first constant, and the adiabatic index, and the second factor determined as the second mathematical function of the normalized temperature and the first constant.

17. The system of claim 12, wherein the compressor section comprises at least one low compressor stage positioned upstream of at least one high pressure compressor stage, further wherein the instructions are executable by the processing unit for determining the pressure of fluid at the exit of the compressor section comprising obtaining at least one pressure measurement from at least one pressure sensor located at one of an outlet of the at least one high pressure compressor stage and an inlet of the combustor.

18. The system claim 12, wherein the pressure of fluid at the exit of the compressor section is a first pressure, the instructions executable by the processing unit for determining a second pressure of fluid at the location upstream of the exit of the compressor section and computing a ratio of the first pressure to the second pressure, the first factor determined as the first mathematical function of the ratio, the first constant, and the adiabatic index.

* * * * *